United States Patent
Roos et al.

(10) Patent No.: US 9,440,655 B2
(45) Date of Patent: Sep. 13, 2016

(54) METHOD OF SELECTING MODES OF OPERATION FOR A HYBRID VEHICLE

(75) Inventors: Bryan N. Roos, Livonia, MI (US); Thomas K. Dye, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 222 days.

(21) Appl. No.: 13/568,981

(22) Filed: Aug. 7, 2012

(65) Prior Publication Data

US 2014/0046518 A1    Feb. 13, 2014

(51) Int. Cl.
*B60W 30/18*     (2012.01)
*B60W 50/08*     (2012.01)
*B60W 30/182*    (2012.01)
*B60W 10/26*     (2006.01)

(52) U.S. Cl.
CPC ............ *B60W 30/182* (2013.01); *B60W 20/12* (2016.01); *B60W 50/082* (2013.01); *B60W 10/26* (2013.01); *B60W 2540/04* (2013.01); *B60W 2550/402* (2013.01); *Y02T 90/14* (2013.01)

(58) Field of Classification Search
CPC ........... B60W 20/104; G01C 21/3469; Y02T 10/6291
USPC ........................................................ 701/99
See application file for complete search history.

(56) References Cited

U.S. PATENT DOCUMENTS

| 8,285,433 | B2 * | 10/2012 | Ang ................................ 701/22 |
| 8,290,701 | B2 * | 10/2012 | Mason et al. ................. 701/422 |
| 8,401,733 | B2 * | 3/2013  | Weslati et al. .................. 701/36 |
| 8,543,272 | B2 * | 9/2013  | Yu et al. .......................... 701/22 |
| 2011/0184600 | A1 * | 7/2011  | Kristinsson et al. ........... 701/22 |
| 2011/0288712 | A1 * | 11/2011 | Wang et al. ..................... 701/22 |
| 2011/0288737 | A1 * | 11/2011 | Carr ................................ 701/99 |
| 2013/0116870 | A1 * | 5/2013  | Harty ............................. 701/22 |

OTHER PUBLICATIONS

Ford Motor Company, Ford Hybrid's EV+ Feature Learns and Automatically Adjusts Powertrain to Deliver More Electric-Only Driving, Nov. 8, 2012, 3 pages, http://media.ford.com/article_display.cfm?article_id=37344, Dearborn, Michigan.

* cited by examiner

*Primary Examiner* — Todd Melton
(74) *Attorney, Agent, or Firm* — Reising Ethington, P.C.; Lionel D. Anderson

(57) ABSTRACT

A method for enabling a user of a hybrid vehicle to assign different modes of operation to different segments of a particular route instead of, for example, simply operating the vehicle in an electric mode until its battery is depleted and then switching to an engine or charge-sustaining mode. This method may be useful in situations where a plug-in hybrid electric vehicle (PHEV) is being frequently driven on a particular route whose distance exceeds the PHEV's electric mode range. The customized route, complete with operating mode selections for certain route segments, can be stored at the vehicle and automatically implemented when the vehicle recognizes the stored route. Other potential features include evaluating the route after it has been developed and/or driven and providing the user with some feedback so that they can make it more efficient.

14 Claims, 2 Drawing Sheets

METHOD OF SELECTING MODES OF OPERATION FOR A HYBRID VEHICLE

FIELD

The present invention generally relates to a hybrid vehicle and, more particularly, to a method that allows the user to select different modes of operation for a hybrid vehicle.

BACKGROUND

A hybrid vehicle may be driven by two or more sources of power, such as an electric motor and an internal combustion engine. Many hybrid electric vehicles (HEVs) are set up so that the vehicle operates in an electric mode until the battery is depleted, at which time the vehicle switches to an engine mode. However, there may be instances where a user wishes to select an electric mode for certain segments of a commonly driven route and an engine mode for other segments, instead of simply operating the vehicle in the electric mode until the battery is depleted.

SUMMARY

According to one embodiment, there is provided a method for use with a hybrid vehicle. The method may comprise the steps of: (a) receiving route information from a user; (b) using the route information to develop a route; (c) receiving an operating mode selection from the user; and (d) using the operating mode selection to assign a certain operating mode of the hybrid vehicle to a certain segment of the route, wherein the route includes a plurality of individual segments.

DRAWINGS

Figure 1:
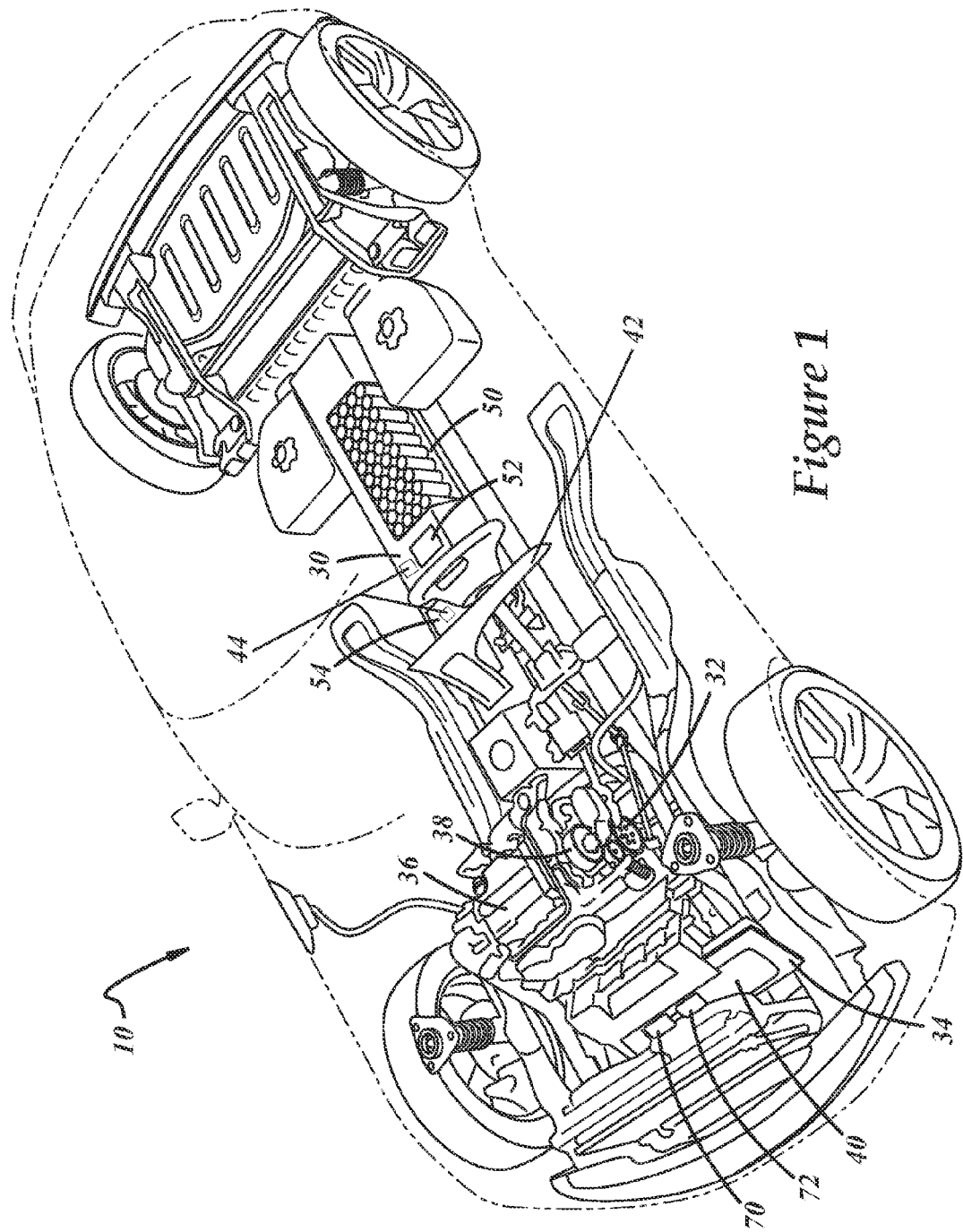
Figure 2:
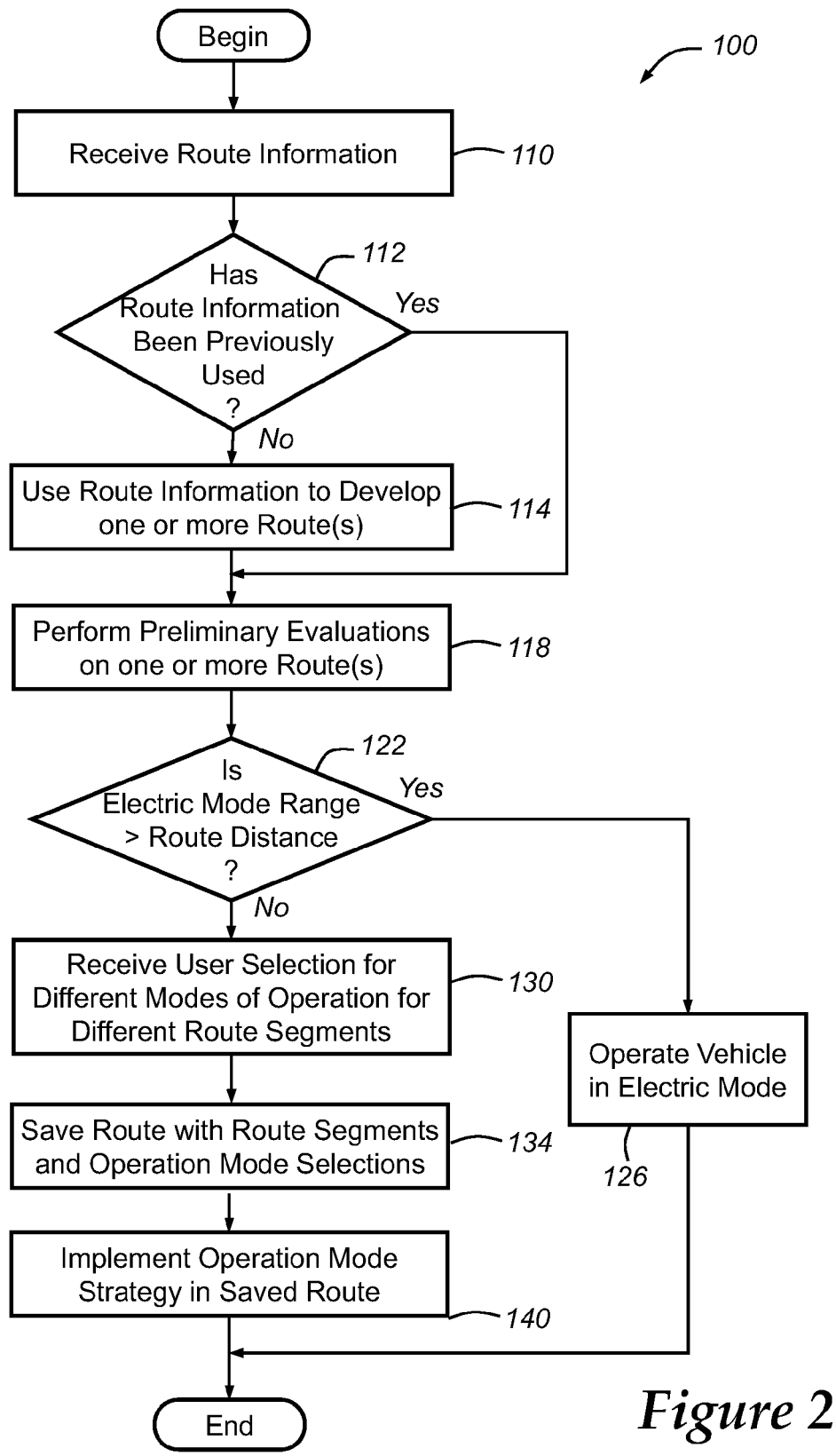

Preferred exemplary embodiments will hereinafter be described in conjunction with the appended drawings, wherein like designations denote like elements, and wherein:

FIG. 1 is a schematic view showing portions of an exemplary hybrid vehicle, in this case a hybrid electric vehicle (HEV); and FIG. 2 is a flowchart illustrating an exemplary method of selecting modes of operation for a hybrid vehicle, such as the hybrid electric vehicle (HEV) of FIG. 1.

DESCRIPTION

The method described herein allows a user of a hybrid vehicle to select or assign different modes of operation to different segments of a particular route instead of, for example, simply operating the vehicle in an electric mode until a battery is depleted and then switching to an engine mode. This method may be particularly useful in situations where a plug-in hybrid electric vehicle (PHEV) is frequently being driven on a particular route whose distance exceeds the PHEV's electric mode range. Consider the example where a frequently-driven route from the user's home to their work includes a first segment through a neighborhood, a second segment across some surface streets, and a third segment along a highway; and assume that the total distance of these three segments exceeds the electric mode range of the PHEV. The present method allows the user to individually select which of these segments will be driven in an electric mode and which will be driven in an engine mode or charge-sustaining mode, thereby enabling the user to more efficiently match up certain driving modes with certain route segments (e.g., the electric mode can be paired with the first segment through the neighborhood, the engine mode can be paired with the third segment along the highway). According to some other potential features, the method may automatically evaluate the user-selected route after it has been developed and/or driven and provide the user with some feedback regarding the electrical energy used, the fuel consumption, or both so that the user can refine the particulars of the route in order to make it more efficient.

A "hybrid vehicle," as used herein, broadly includes any vehicle that has two or more sources of power that can be used for vehicle propulsion. Some examples of suitable hybrid vehicles include, but are certainly not limited to, hybrid electric vehicles (HEVs), plug-in hybrid electric vehicles (PHEVs), extended-range electric vehicles (EREVs), two-mode hybrids, full hybrids, power-assist hybrids, mild hybrids, series hybrids, parallel hybrids, series-parallel hybrids, power-split hybrids, BAS or BAS-plus hybrids, hydraulic hybrids, pneumatic hybrids, fuel cell hybrids, or any other type of hybrid vehicle. This includes passenger cars, cross-over vehicles, sports-utility vehicles, recreational vehicles, trucks, buses, commercial vehicles, etc. Although the following description is provided in the context of an exemplary plug-in hybrid electric vehicle (PHEV) with a range-extending series hybrid configuration, it should be appreciated that the present method may be used with any hybrid vehicle and is not limited to any particular type.

With reference to FIG. 1, there is shown a schematic view of an exemplary plug-in hybrid electric vehicle (PHEV) 10 having a range-extending series hybrid configuration where a high voltage battery drives an electric motor for vehicle propulsion, and an internal combustion engine drives a generator for producing electrical energy. According to this exemplary embodiment, hybrid vehicle 10 includes a battery 30, an electric motor 32, an inverter/converter 34, an engine 36, a generator 38, a control module 40, a user interface 42, and a navigation module 44. Because many of the components of hybrid vehicle 10 are generally known in the art and because many different components and arrangements may be used with the present method, a brief explanation is provided here in lieu of a detailed recitation of their individual structure and functionality.

Battery 30 provides the hybrid vehicle with electrical power and, depending on the particular embodiment, may be the primary electrical power source for the vehicle. Many different battery types and arrangements may be used, including the exemplary one schematically shown here which includes a battery pack 50, one or more battery sensors 52, and a battery control unit 54. Battery pack 50 is a high-voltage battery pack and may include a collection of individual battery cells connected in series, parallel, or a combination of both in order to deliver a desired voltage, amperage, capacity, power density and/or other performance characteristics. Generally, it is desirable to provide high power and energy densities, which has led to the development and use of many types of batteries including chemical, non-chemical, and others. Some examples of suitable battery types include those that are based on the following technologies: lithium ion, nickel metal hydride (NiMH), nickel cadmium (NiCd), sodium nickel chloride (NaNiCl), or some other battery technology. Battery pack 50 may provide approximately 40-600V, depending on its particular design and application. For example, a heavy truck using a two-mode hybrid system may require a high voltage battery pack capable of providing about 350V, where a lighter vehicle may only need about 200V. In another embodiment, battery 30 may be part of a belt-alternator-starter (BAS) or BAS-plus type system and thus only require a battery pack that provides about 40-110V. In any case, battery pack 50 should be designed to withstand repeated charge and discharge cycles and to receive electrical energy from an external power source. Skilled artisans will appreciate that the system and method shown and described herein are not limited to any one particular type of battery or battery arrangement, as a number of different battery types could be employed.

Battery sensors 52 may include any combination of hardware and/or software components capable of monitoring battery conditions such as battery temperature, battery voltage, battery current, battery state of charge (SOC), battery state of health (SOH), etc. These sensors may be integrated within the battery unit 30 (e.g., an intelligent or smart battery), they may be external sensors located outside of the battery unit, or they may be provided according to some other known arrangement. Battery sensors 52 may monitor and determine battery conditions on a cell-by-cell basis, on an average or collective basis across a block or region of cells, on an entire battery pack basis, on a representative basis where certain cells are selected to represent the entire battery pack, or according to some other basis or technique known in the art. Output from battery sensors 52 may be provided to battery control unit 54, control module 40, or some other appropriate device.

Battery control unit 54 may include any variety of electronic processing devices, memory devices, input/output (I/O) devices, and other known components, and may perform various control and/or communication related functions. For example, battery control unit 54 may receive sensor signals from the various battery sensors 52, package the sensor signals into an appropriate sensor message, and send the sensor message to control module 40 over a communication bus or the like. It is possible for battery control unit 54 to gather battery sensor readings and store them in local memory so that a comprehensive sensor message can be provided to control module 40 at a later time, or the sensor readings can be forwarded to module 40 or some other destination as soon as they arrive at battery control unit 54, to cite a few possibilities. Instead of sending the battery sensor readings to control module 40 for subsequent processing, it is possible for battery control unit 54 to process or analyze the sensor readings itself. In another capacity, battery control unit 54 can store pertinent battery characteristics and background information pertaining to the battery's cell chemistry, cell capacity, upper and lower battery voltage limits, battery current limits, battery temperature limits, temperature profiles, battery impedance, number or history of charge/discharge events, etc.

Electric motor 32 may use electrical energy stored in battery 30 to drive one or more vehicle wheels, which in turn propels the vehicle. While FIG. 1 schematically depicts electric motor 32 as a single discrete device, the electric motor may be combined with a generator (a so-called "mogen") or it may include multiple electric motors (e.g., separate motors for the front and rear wheels, separate motors for each wheel, separate motors for different functions, etc.), to cite a few possibilities. Hybrid vehicle 10 is not limited to any one particular type of electric motor, as many different motor types, sizes, technologies, etc. may be used. In one example, electric motor 32 includes an AC motor (e.g., a three-phase or other multi-phase AC induction motor, etc.), as well as a generator that can be used during regenerative braking. Electric motor 32 may be provided according to any number of different embodiments (e.g., AC or DC motors, brushed or brushless motors, permanent magnet motors, etc.), it may be connected in any number of different configurations, and it may include any number of different components, like cooling features, sensors, control units and/or any other suitable components known in the art.

Inverter/converter 34 may act as an intermediary between battery 30 and electric motor 32, as these two devices are often times designed to function according to different operational parameters. For example, during vehicle propulsion inverter/converter 34 may step-up the voltage from battery 30 and convert the current from DC to AC in order to drive electric motor 32, while during regenerative braking the inverter/converter may step-down the voltage generated by a braking event and convert the current from AC to DC so that it can be properly stored by the battery. In a sense, inverter/converter 34 manages how these different operational parameters (i.e., AC versus DC, various voltage levels, etc.) work together. Inverter/converter 34 may include an inverter for DC to AC conversion, a rectifier for AC to DC conversion, a step-up converter or transformer for increasing the voltage, a step-down converter or transformer for decreasing the voltage, other suitable energy management components, or some combination thereof. In the exemplary embodiment shown, inverter and converter units are integrated into a single bi-directional device; however, other embodiments are certainly possible. It should be realized that inverter/converter 34 may be provided according to any number of different embodiments (e.g., with separate inverter and converter units, bi-directional or uni-directional, etc.), may be connected in any number of different configurations, and may include any number of different components, like cooling systems, sensors, control units and/or any other suitable components known in the art.

Engine 36 may drive generator 38 using conventional internal combustion techniques, and may include any suitable type of engine known in the art. Some examples of suitable engines include gasoline, diesel, ethanol, flex-fuel, naturally aspirated, turbo-charged, super-charged, rotary, Otto-cycle, Atkins-cycle and Miller-cycle engines, as well as any other suitable engine type known in the art. According to the specific embodiment shown here, engine 36 is a small fuel-efficient engine (e.g., a small displacement, turbo-charged four-cylinder engine) that uses its mechanical output to turn generator 38. Skilled artisans will appreciate that engine 36 may be provided according to any number of different embodiments, may be connected in any number of different configurations (e.g., engine 36 could be part of a parallel hybrid system where the engine is also mechanically coupled to the vehicle wheels instead of exclusively being used to generate electricity), and may include any number of different components, like sensors, control units and/or any other suitable components known in the art.

Generator 38 is mechanically coupled to engine 36 so that the mechanical output of the engine causes the generator to create electrical power that may be provided to battery 30, electric motor 32, or both. It is worth noting that generator 38 may be provided according to any number of different embodiments (e.g., the generator of motor 32 and generator 38 may be combined into a single unit), may be connected in any number of different configurations, and may include any number of different components, like sensors, control units and/or any other suitable components known in the art. Generator 38 is not limited to any specific generator type or embodiment.

Control module 40 may be used to control, govern or otherwise manage certain operations or functions of hybrid vehicle 10 and, according to one exemplary embodiment, includes a processing device 70 and a memory device 72. Processing device 70 may include any type of suitable electronic processor (e.g., a microprocessor, a microcontroller, an application specific integrated circuit (ASIC), etc.) that executes instructions for software, firmware, programs, algorithms, scripts, etc. This processor is not limited to any one type of component or device. Memory device 72 may include any type of suitable electronic memory means and may store a variety of data and information. This includes, for example: sensed battery conditions; look-up tables and other data structures; software, firmware, programs, algorithms, scripts, and other electronic instructions; component characteristics and background information, etc. The present method—as well as any other electronic instructions and/or information needed for such tasks—may also be stored or otherwise maintained in memory device 48. Control module 40 may be electronically connected to other vehicle devices and modules via I/O devices and suitable connections, like a communications bus, so that they can interact as required. These are, of course, only some of the possible arrangements, functions and capabilities of control module 40, as others are certainly possible.

Depending on the particular embodiment, control module 40 may be a stand-alone electronic module (e.g., a hybrid control module, a vehicle integration control module (VICM), a traction power inverter module (TPIM), a battery power inverter module (BPIM), etc.), it may be incorporated or included within another electronic module in the vehicle (e.g., a power train control module, an engine control module, etc.), or it may be part of a larger network or system (e.g., a battery management system (BMS), a vehicle energy management system, etc.), to name a few possibilities. Control module 40 is not limited to any one particular embodiment or arrangement.

User interface 42 may include any combination of hardware, software and/or other components that enable a vehicle user to exchange information or data with the vehicle. This includes, for example, input components like a touch-screen display, a microphone, a keyboard, a pushbutton or other control where user interface 42 receives information from a vehicle user, as well as output components like a visual display, an instrument panel, or an audio system where user interface 42 provides information to the vehicle user. In some cases, user interface 42 includes components with both input and output capabilities, such as visual and audible interfaces. The audible interface may be part of an automated voice processing system that uses voice-recognition and/or other human-machine interface (HMI) technology. User interface 42 may be a stand-alone module; it may be part of an infotainment system or part of some other module, device or system in the vehicle; it may be mounted on a dashboard or a center consul (e.g., with a map provided by a navigation module, driver information center (DIC)); it may be projected onto a windshield (e.g., with a heads-up display); it may be integrated within an existing audio system; or it may simply include an electronic connection or port for connecting with a laptop or other computing device, to cite a few examples. As explained below in more detail, user interface 42 may be used to gather information from and/or to provide information to a user in a manner that facilitates the present method. Other user interfaces may be used instead, as the exemplary user interface 42 shown and described herein represents only one of the possibilities.

Navigation module 44 provides a variety of navigation-related services, including services and information that are used by the present method. Depending on the particular embodiment, navigation module 44 may be a stand-alone component or it may be integrated within some other component or system within the vehicle, such as user interface 42. The navigation module may include any combination of other components, devices, modules, etc., like a telematics unit or a GPS unit, and may use the current position of the vehicle and road- or map-data to provide route information, directions, route distances, route traveling times, traffic conditions (e.g., heavy traffic, light traffic, etc.), road conditions (e.g., road construction, lane/road closure, etc.), or any other information that may be needed by the method discussed herein. This type of navigation-related information may be provided to or received from control module 40, user interface 42 and/or some other device so that it can be taken into account by the present method, as will be explained in more detail.

Again, the preceding description of exemplary hybrid vehicle 10 and the drawing in FIG. 1 are only intended to illustrate one potential embodiment, as the following method is not confined to use with only that system. Any number of other system arrangements, combinations and architectures, including those that differ significantly from the one shown in FIG. 1, may be used instead.

Turning now to FIG. 2, there is shown an exemplary method 100 that may be used with hybrid vehicle 10 in order to select certain modes of operation and therefore better manage energy within the hybrid vehicle. In step 110, the method receives one or more pieces of route information, and may do so in a variety of ways. "Route information" broadly includes any type of selection, input, data and/or other type of information that pertains to or is used to develop a route. Some non-limiting examples of route information include: start locations, destination locations, mid- or way-point locations, mileage markers, road preferences, traffic and construction updates, etc. Start locations, destination locations and mid-point locations may be provided in any suitable form, including being provided as coordinates (e.g., GPS or Cartesian coordinates), specific addresses (e.g., street number, street name, city, state, zip), cross-roads or intersections (e.g., the intersection of Main and Elm Streets, etc.), general locations (e.g., downtown Detroit, etc.), or any combination thereof. Step 110 may use the current location of the hybrid vehicle 10 as either the start or the destination location so that the user does not have to physically enter it.

In an exemplary embodiment, step 110 receives one or more start and destination locations, as well as any other relevant route information like road preferences, from a user via user interface 42 so that the method can develop or establish a route. The route information may be provided through a user interface 42 having a keyboard, voice-recognition software, touch-screen or some other suitable means. It is also possible for the user or some other entity to provide this information remotely, such as through a mobile device, an affiliated website, a call center, etc. Those skilled in the art will appreciate that certain precautionary requirements may be appropriate—such as prohibiting data entry or route modification when the hybrid vehicle is moving. In the examples where the information is provided remotely, a direct and secure download from a mobile device, an affiliated website or a call center could be used to transmit the information, at which point the vehicle user could be presented with the option of accepting or rejecting it.

It should be appreciated that the present method may be used with a single route having a single pair of start and destination locations (e.g., a single route from the user's home to their work), or it may be used with multiple routes strung together where each route has its own pair of start and destination locations (e.g., a first route from the user's home to their work, a second route from their work to a grocery store, and a third route from the grocery store back to their home). In the case of multiple routes, the second route usually starts near where the first one ends, the third route usually starts near where the second ends, and so on in a generally serial fashion. As mentioned above, each route may be divided into one or more segments, each of which represents distinct sections or portions of the route. In the multi-route example above, the first route from the user's home to their work could include a first segment through a neighborhood, a second segment across some surface streets, and a third segment along a highway. Dividing the route up into individual segments—the individual segments preferably have different characteristics, like a surface street versus a highway—can help the user better manage the energy within the hybrid vehicle by selectively assigning the most efficient operating mode of the hybrid vehicle to each segment.

At step 112, which is optional, the method checks to see if the route information that was just received has been previously used by the method. This step could, for example, compare recently entered start and destination locations to previously established route information stored in memory 72. If there is a match, which suggests that a user has already developed a route for those particular locations, then the method could simply display the previously generated route to the user for their confirmation and proceed to step 118. In doing so, the method may save processing resources and the user's time by not duplicating actions previously performed. If there is not a match, then the method can assume that this is the first time the user has entered these particular locations and it can proceed to step 114 so that a corresponding route may be developed. The route developed here will eventually be presented to the user so that they can select certain operating modes for the different segments of the route.

Next, step 114 uses the route information to develop one or more routes. In one example, the method automatically builds or develops a route from the previously provided route information. The method may use the start location and the destination location, as well as other optional route information like road preferences, to automatically generate a route. Those skilled in the art will appreciated that there are numerous methods and techniques for automatically developing or creating routes from such information, including those that use stored map data and route generating algorithms. In another example, the method allows the user to manually create or develop the route from the initially provided route information. For instance, the method could use the provided route information to show the start and destination locations on a map displayed on the user interface 42, at which point the user could make a route selection by tracing or otherwise indicating their desired route from start to finish; this approach assumes that user interface 42 includes a touch-screen or the like. The preceding examples of route development are simply provided to illustrate several possibilities for forming an initial route, as many others exist as well. Once a route has been developed, the method can perform preliminary evaluations on it, as will now be explained. It should be appreciated that at this point, the user has not yet assigned or selected different operating modes for different segments of the route, as they have only established an initial route for further evaluation.

Step 118, which is an optional step, performs preliminary evaluations on the route in order to provide the user with some useful feedback before they make their operating mode selections. In one example, step 118 calculates the mileage or distance of the overall route and compares that to the electric mode range of hybrid vehicle 10. If the electric mode range is greater than the estimated distance of the route, then the method may conclude that there is no need to break the route up into individual segments and assign them different operating modes, as the electric mode could be used over the entire route—this assumes that the user prefers the electric mode due its desirable fuel efficiency. In such a case, step 122 may direct the method to step 126 which simply assigns or establishes electric mode operation for the entire route. If the electric mode range is less than the estimated distance of the route (i.e., the hybrid vehicle can only use electric mode for a portion of the route, but not all of it), then the method proceeds to step 130 so that the user can specifically select which segments of the route they wish to be performed in which operating modes. This differs from previous hybrid vehicles where the vehicle was simply operated in electric mode until the battery was depleted, at which point it would switch to a different operating mode. Other potential types of feedback from the preliminary evaluation include: estimated energy consumption for the overall route, estimated energy consumption for certain segments of the route, recommendations for certain operating modes for certain segments of the route, etc. In general, step 118 evaluates or analyzes the established route and may provide the user with useful information so that the user can make an energy efficient selection for an operating mode.

At this point, the user selects certain modes of operation for different segments of the route, step 130. There are a variety of different ways in which the method may gather or obtain the user's selections. For example, step 130 may display the previously established route on the user interface 42 and highlight different segments of the route with different colors so that the user can easily see where each segment begins and ends; this enables the user to select an electric mode, an engine mode (also known as a charge-sustaining mode), or some other mode of operation for each of the highlighted segments. In a different example, step 130 gathers mid-point or way-point information from the user that dictates where the various segments begin and end, as well as their corresponding selections for modes of operation. Any of the following techniques for gathering user selections may be employed: the method automatically generates the route segments and then asks the user for operating mode selections; the method automatically generates the route segments, gives the user an opportunity to adjust the segments (e.g., via slidebars on a touch screen), and then asks the user for operating mode selections; the user identifies the route segments (e.g., by providing mileage markers or identifying start and destination locations on a touch screen) and makes their operating mode selections; and the user identifies the route segments by driving the proposed route and indicating when a certain segment begins and/or ends and which mode of operation is to be used (e.g., via interface 42 or voice commands).

According to another embodiment, step 130 only gathers selections from the user for the electric mode, and would assume that all other segments were to be operated in an engine or charge-sustaining mode. It should be appreciated that the preceding examples only represent some of the possibilities, as any suitable method or technique may be used for establishing segments of the route and for selecting corresponding modes of operation. Other information may be also displayed during step 130, including the output from the preliminary evaluation of step 118 (e.g., segment/route distance, segment/route driving time, segment/route energy consumption, etc.).

Next, step 134 saves the route complete with the various route segments and operating mode selections. In an exemplary embodiment, step 134 saves the route and corresponding operating mode information in memory device 72, but any suitable memory location could be used.

Now that the route has been saved, step 140 implements the operating mode strategy embodied in the saved route. For example, whenever the hybrid vehicle 10 is being driven, the method could be on the lookout so that it can recognize when the route is being traveled and can engage the appropriate mode of operation at the appropriate point. In the route example provided above, if hybrid vehicle 10 is being driven from the user's home to their work, navigation module 44 or some other suitable device may recognize that the vehicle is traversing the first segment of the route and could cause the vehicle to be driven in an electric mode or whatever operating mode was assigned to that segment. Step 140 may be designed to automatically recognize when the route is being traversed or to wait to receive instructions from the user before implementing the stored mode of operation strategy.

At any point during operation, user interface 42 may provide the operator with related information, such as: the distance to the next operating mode (e.g., 1 mile left in electric mode); flashing the current route segment on a map, while showing the vehicle position on that segment; the instantaneous or average fuel economy energy consumption; energy remaining; etc. While operating the vehicle in a specific operating mode, method 100 may provide the operator with the opportunity to manually disable the current operating mode. In another embodiment, a detour may be encountered and method 100 may have to readjust a segment and/or route in order to accommodate the detour. In this case, method 100 may provide a warning to the user via user interface 42 and gather instructions as to whether the method should ignore the detour, recalculate the route, restart from its beginning, or just disable the current mode operation and run in a vehicle default mode. Myriad other features may also be used.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method for use with a hybrid vehicle, comprising the steps of:
    (a) receiving route information from a user;
    (b) using the route information to develop a route having a plurality of individual segments, each of the plurality of individual segments represents a distinct section of the route;
    (c) performing a preliminary evaluation on the route by comparing the overall distance of the route to the electric mode range of the hybrid vehicle and by determining the expected energy consumption for each of the plurality of individual segments, presenting feedback to the user before the user makes an operating mode selection where the feedback includes results from the preliminary evaluation comparison and the preliminary evaluation determination, and receiving an operating mode selection from the user; and
    (d) when the overall distance of the route does not exceed the electric mode range of the hybrid vehicle then selecting the electric mode for the entire route and when the overall distance of the route does exceed the electric mode range of the hybrid vehicle then using the operating mode selection from the user to assign a certain operating mode of the hybrid vehicle to a certain individual segment of the route, wherein at least one of the individual segments is assigned an operating mode that was specifically selected by the user.

2. The method of claim 1, wherein step (a) further comprises receiving route information from the user that includes a start location and a destination location; and step (b) further comprises using the start location and the destination location to develop the route.

3. The method of claim 2, wherein step (b) further comprises using the start location, the destination location, map data and a route generating algorithm to automatically develop the route.

4. The method of claim 2, wherein step (b) further comprises displaying the start location and the destination location to the user, receiving a route selection from the user, and using the start location, the destination location, and the route selection to manually develop the route.

5. The method of claim 1, wherein the preliminary evaluation further includes at least one piece of feedback from the group consisting of: an estimated energy consumption for the entire route or a recommendation for certain operating modes for certain segments of the route.

6. The method of claim 1, wherein step (c) further comprises automatically generating the plurality of individual segments of the route and receiving an operating mode selection from the user for each of the plurality of segments.

7. The method of claim 6, wherein step (c) further comprises enabling the user to adjust the plurality of individual segments of the route by presenting the automatically generated segments of the route on a touch screen of a user interface that includes adjustable slidebars.

8. The method of claim 1, wherein step (c) further comprises allowing the user to generate the plurality of individual segments of the route and receiving an operating mode selection from the user for each of the plurality of segments.

9. The method of claim 8, wherein step (c) further comprises enabling the user to generate the plurality of individual segments of the route by receiving voice commands from the user through a user interface that dictates the start and/or destination locations of the segments.

10. The method of claim 1, further comprising the steps of:
(e) saving the route including the plurality of individual segments and the corresponding operating mode selections; and
(f) implementing a certain mode of operation when the hybrid vehicle encounters a certain segment of the route.

11. The method of claim 10, wherein step (f) further comprises automatically recognizing when the hybrid vehicle is being driven on the route and implementing a certain mode of operation when the hybrid vehicle encounters a certain segment of the route.

12. The method of claim 1, wherein step (a) further comprises receiving route information from the user that includes a plurality of start locations and destination locations; and step (b) further comprises using the route information to develop a plurality of routes that each extends from a different start location to a different destination location, and the plurality of routes are generally joined in serial fashion.

13. A method for use with a hybrid vehicle, comprising the steps of:
(a) developing a route having a plurality of individual segments, each of the plurality of individual segments represents a distinct section of the route;
(b) performing a preliminary evaluation of the route by providing a user with an estimated energy consumption for each of the individual segments or an estimated energy remaining for each of the individual segments;
(c) receiving an operating mode selection from the user, and using the operating mode selection to assign a certain operating mode of the hybrid vehicle to a certain individual segment of the route;
(d) operating the hybrid vehicle according to the certain operating mode when the hybrid vehicle is driven along the certain individual segment;
(e) performing an additional evaluation of the route by providing the user with an actual energy consumption for the certain individual segment or an actual energy remaining for the certain individual segment; and
(f) receiving an additional operating mode selection from the user, and using the additional operating mode selection to change the assignment of the certain operating mode for the certain individual segment.

14. A method for use with a hybrid vehicle, comprising the steps of:
(a) saving a route that includes a plurality of individual segments and a corresponding plurality of operating mode selections, wherein each of the plurality of individual segments pertains to a distinct section of the route and each of the corresponding plurality of operating mode selections corresponds to one of the individual segments;
(b) automatically recognizing that the hybrid vehicle is being driven on the saved route;
(c) presenting feedback to a user where the feedback includes results from a preliminary evaluation comparison and a preliminary evaluation determination, wherein the preliminary evaluation comparison includes comparing the overall distance of the route to the electric mode range of the hybrid vehicle, and wherein the preliminary evaluation determination includes determining the expected energy consumption for each of the plurality of individual segments;
(d) identifying the certain segment of the saved route whereon the hybrid vehicle is being driven;
(e) retrieving the corresponding operating mode selection for the certain segment of the saved route; and
(f) operating the hybrid vehicle in the retrieved operating mode for the certain segment of the saved route.

* * * * *